United States Patent
Bent et al.

(10) Patent No.: US 9,183,211 B1
(45) Date of Patent: Nov. 10, 2015

(54) COOPERATIVE STORAGE OF SHARED FILES IN A PARALLEL COMPUTING SYSTEM WITH DYNAMIC BLOCK SIZE

(71) Applicants: John M. Bent, Los Alamos, NM (US); Sorin Faibish, Newton, MA (US); Gary Grider, Los Alamos, NM (US)

(72) Inventors: John M. Bent, Los Alamos, NM (US); Sorin Faibish, Newton, MA (US); Gary Grider, Los Alamos, NM (US)

(73) Assignees: EMC Corporation, Hopkinton, MA (US); Los Alamos National Security, LLC, Los Alamos, NM (US)

( * ) Notice: Subject to any disclaimer, the term of this patent is extended or adjusted under 35 U.S.C. 154(b) by 15 days.

(21) Appl. No.: 13/730,080

(22) Filed: Dec. 28, 2012

(51) Int. Cl.
*G06F 17/30* (2006.01)

(52) U.S. Cl.
CPC .......... *G06F 17/30091* (2013.01); *G06F 17/30* (2013.01)

(58) Field of Classification Search
None
See application file for complete search history.

(56) References Cited

U.S. PATENT DOCUMENTS

| | | | | |
|---|---|---|---|---|
| 5,946,686 | A * | 8/1999 | Schmuck et al. | 707/783 |
| 6,691,212 | B1 * | 2/2004 | McNeil et al. | 711/162 |
| 6,785,768 | B2 * | 8/2004 | Peters et al. | 711/112 |
| 2010/0088317 | A1 * | 4/2010 | Bone et al. | 707/737 |
| 2011/0282832 | A1 * | 11/2011 | Rishel et al. | 707/609 |
| 2012/0296872 | A1 * | 11/2012 | Frost et al. | 707/634 |
| 2013/0159364 | A1 | 6/2013 | Grider et al. | |

OTHER PUBLICATIONS

Bent et al., "PLFS: a checkpoint filesystem for parallel applications," Proceedings of the Conference on High Performance Computing Networking, Storage and Analysis (SC '09). ACM, New York, N.Y., USA, 12 pages, 2009.*

* cited by examiner

*Primary Examiner* — Robert Beausoliel, Jr.
*Assistant Examiner* — Pedro J Santos
(74) *Attorney, Agent, or Firm* — Ryan, Mason & Lewis, LLP

(57) ABSTRACT

Improved techniques are provided for parallel writing of data to a shared object in a parallel computing system. A method is provided for storing data generated by a plurality of parallel processes to a shared object in a parallel computing system. The method is performed by at least one of the processes and comprises: dynamically determining a block size for storing the data; exchanging a determined amount of the data with at least one additional process to achieve a block of the data having the dynamically determined block size; and writing the block of the data having the dynamically determined block size to a file system. The determined block size comprises, e.g., a total amount of the data to be stored divided by the number of parallel processes. The file system comprises, for example, a log structured virtual parallel file system, such as a Parallel Log-Structured File System (PLFS).

20 Claims, 7 Drawing Sheets

```
int
ad_plfs_write(MPI_File *file, char *callers_buf, off_t, len_t len) {

// create arrays to exchange info about offsets and lengths with our peer
    off_t *offsets = malloc(sizeof(off_t) * file->num_procs);
    len_t *lengths = malloc(sizeof(len_t) * file->num_procs);

// do the exchange
    MPI_Reduce_all(file->comm, file->rank, off, len, offsets, lengths);

// some variables about how much data will be shuffled
    // every rank will either send/receive to peer on left and peer on right
    len_t bytes_from_left, bytes_from_right, bytes_to_left, bytes_to_right;
    len_t bytes_each;   // how many bytes does each rank write
    len_t total_bytes;  // how many total bytes are being written now // now do some complicated math to figure out how many bytes to shuffle
    bool possible = compute_shuffling(file->num_procs, offsets, lengths,
            file->rank, &bytes_from_left, &bytes_from_right, &bytes_to_left,
            &bytes_to_right, &total_bytes);

// do the simple write and exit if simple shuffling isn't possible
    if ( ! possible ) {
        return pwrite(file->fd, callers_buf, len, off);
    }

// make the buffer for the write and for receiving bytes
    char *write_buf = malloc(sizeof(char) * bytes_each);
```

FIG. 4B

```
// now shuffle bytes with neighbor on left.
if (bytes_from_left > 0) {
  // receive them into our write buffer at offset 0
  MPI_Receive(file->rank-1, write_buf[0], bytes_from_left);
} else if (bytes_to_left > 0) {
  // send them from our callers_buf
  MPI_Send(file->rank-1, callers_buf[0], bytes_to_left);
}

// now shuffle bytes with neighbor on right.
if (bytes_from_right > 0) {
  // receive them into our write buffer from the end
  MPI_Receive(file->rank+1, write_buf[bytes_each - bytes_from_right],
      bytes_from_right);
} else if (bytes_to_right > 0) {
  // send them from our callers_buf
  MPI_Send(file->rank+1, callers_buf[len - bytes_to_right],
      bytes_to_right);
}

// now copy anything left from callers_buf to write_buf
if (bytes_to_left + bytes_to_right < bytes_each) {
    memcpy(write_buf[bytes_from_left], callers_buf[bytes_to_left],
      bytes_each - bytes_to_left - bytes_to_right);
}
```

```
// finally do the write
// rank n-1 might write fewer than the rest. Adjust accordingly.

len_t my_write_size = bytes_each;
  If (file->rank == file->num_procs - 1) {
      len_t extra_bytes = bytes_each * num_procs;
      my_write_size = total_bytes - extra_bytes;
  }
  return pwrite(file->fd,write_buf,my_write_size,
            off - bytes_from_left + bytes_to_right);
}
```

FIG. 5

```
int
compute_shuffling(int num_procs, off_t offsets[], len_t lengths[],         500
         int my_rank,
         len_t *bytes_from_left, len_t *bytes_from_right,
         len_t *bytes_to_left, len_t *bytes_to_right, len_t *total_bytes)
{
    // initialize the return values
    *bytes_from_left = 0;
    *bytes_from_right = 0;
    *bytes_to_left = 0;
    *bytes_to_right = 0;

// compute the total number of bytes
    len_t total_bytes = 0;
    for( int i = 0; i < num_procs; i++ ) {
        *total_bytes += lengths;
    }

// now figure out the balanced number of bytes for each rank
    // use math ceil of the division which may leave the last rank with
    // a few bytes fewer than the rest.
    len_t bytes_each = ceil((float)*total_bytes / num_procs);

// now go back through and check whether simple shuffling is possible
    for ( int i = 0; i < numb_procs; i++ ) {
        len_t balanced_start = i * bytes_each;
        len_t balanced_end = balanced_start + bytes_each;

if (abs(balanced_start - offsets[i]) > bytes_each)
            return false;
        if (abs(balanced_end - (offsets[i] + lengths[i])) > bytes_each)
            return false;
    }

// if we make it here, then simple shuffling is possible, proceed

//now figure out what my start and end offset should be
    off_t my_balanced_offset = my_rank * bytes_each;
    off_t my_balanced_end = my_balanced_offset + bytes_each;
    off_t my_current_end = offsets[my_rank] + lengths[my_rank];

if (my_balanced_offset < offsets[my_rank]) {
        *bytes_from_left = my_balanced_offset - offsets[my_rank];
    } else if (my_balanced_offset > offsets[my_rank]) {
        *bytes_to_left = offsets[my_rank] - my_balanced_offset;
    }
    if (my_current_end < my_balanced_end {
        *bytes_from_right = my_balanced_end - my_current_end;
    } else if (my_current_end > my_balanced_end) {
        *bytes_to_right = my_current_end - my_balanced_end;
    } return true;
```

US 9,183,211 B1

COOPERATIVE STORAGE OF SHARED FILES IN A PARALLEL COMPUTING SYSTEM WITH DYNAMIC BLOCK SIZE

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

FIELD

The present invention relates to parallel storage in high performance computing environments.

BACKGROUND

Parallel storage systems are widely used in many computing environments. Parallel storage systems provide high degrees of concurrency in which many distributed processes within a parallel application simultaneously access a shared file namespace.

Parallel computing techniques are used in many industries and applications for implementing computationally intensive models or simulations. For example, the Department of Energy uses a large number of distributed compute nodes tightly coupled into a supercomputer to model physics experiments. In the oil and gas industry, parallel computing techniques are often used for computing geological models that help predict the location of natural resources.

When a number of parallel processes write data to a shared object, block boundaries, data integrity concerns and serialization of shared resources have prevented fast shared writing. Recent efforts to address this problem have employed log structured virtual parallel file systems, such as a Parallel Log-Structured File System (PLFS). See, e.g., U.S. patent application Ser. No. 13/536,331, filed Jun. 28, 2012, entitled "Storing Files in a Parallel Computing System Using List-Based Index to Identify Replica Files," incorporated by reference herein. While such techniques have improved the speed of shared writing, they create a secondary challenge to maintain the necessary amount of metadata without creating unnecessary overhead since log structured file systems are known to create more metadata than traditional flat file filesystems.

A need therefore exists for improved techniques for parallel writing of data to a shared object, in order to reduce file system metadata.

SUMMARY

Embodiments of the present invention provide improved techniques for parallel writing of data to a shared object in a parallel computing system. In one embodiment, a method is provided for storing data generated by a plurality of parallel processes to a shared object in a parallel computing system, wherein the method is performed by at least one of the processes and comprises the steps of: dynamically determining a block size for storing the data; exchanging a determined amount of the data with at least one additional process to achieve a block of the data having the dynamically determined block size; and writing the block of the data having the dynamically determined block size to a file system.

In one exemplary embodiment, the determined block size comprises a total amount of the data to be stored by the plurality of parallel processes divided by a number of the plurality of parallel processes. The file system comprises, for example, a log structured virtual parallel file system, such as a Parallel Log-Structured File System (PLFS).

Advantageously, illustrative embodiments of the invention provide techniques for parallel writing of data to a shared object. These and other features and advantages of the present invention will become more readily apparent from the accompanying drawings and the following detailed description.

BRIEF DESCRIPTION OF THE DRAWINGS

FIGS. 4A through 4C, collectively, illustrate exemplary pseudo code for performing the cooperative parallel writing of FIG. 3; and FIG. 5 illustrates exemplary pseudo code for determining how many bytes to shuffle for the process of FIG. 4.

DETAILED DESCRIPTION

The present invention provides improved techniques for cooperative parallel writing of data to a shared object. Generally, aspects of the present invention leverage the parallelism of concurrent writes to a shared object and the high interconnect speed of parallel supercomputer networks to move a small amount of data in order to eliminate a significant amount of metadata. Metadata records a location for every byte of data. When the data is well-organized, the metadata can record a single pattern that describes the data written by all writers. Unorganized data, however, requires a unique piece of metadata for each piece of data written by each writer. Typically, the writers are writing data from a structured, but adaptively sized, multi-dimensional mesh. In this instance, if each writer can shuffle a small amount of data to a neighbor, then every writer can write the same amount of data and thus, the metadata can be compressed to a single pattern. For large systems, the reduction in metadata can be several orders of magnitude achieved by only moving a small fraction of the data.

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "files" shall include complete files and portions of files, such as sub-files or shards.

Figure 1:
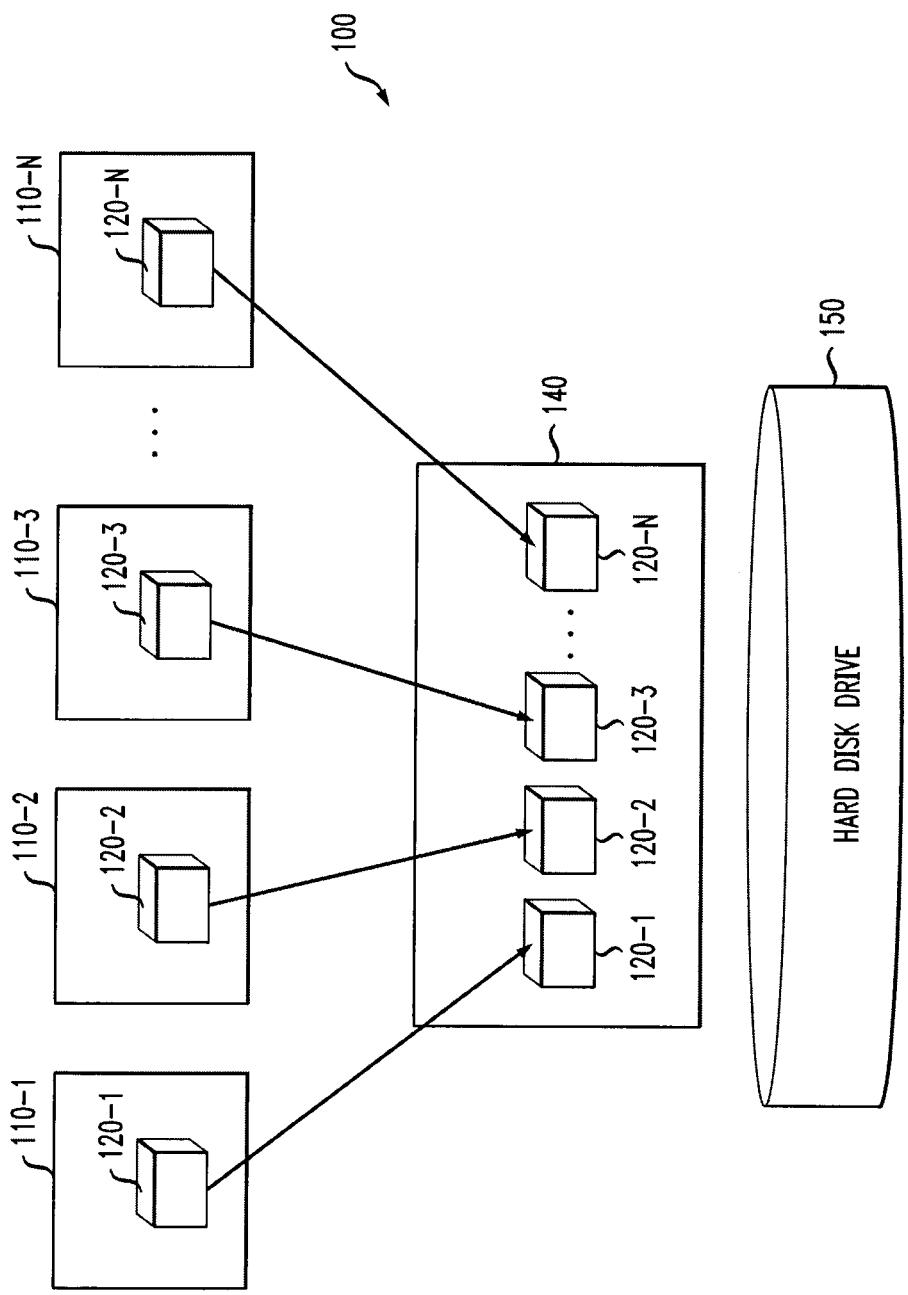
FIG. 1 illustrates an exemplary storage system in which aspects of the present invention can be implemented.

FIG. 1 illustrates an exemplary storage system 100 that incorporates aspects of the present invention. As shown in FIG. 1, the exemplary storage system 100 comprises a plurality of compute nodes 110-1 through 110-N (collectively, compute nodes 110) each having a portion 120-1 through 120-N of a distributed shared data structure or other information to store. The compute nodes 110 optionally store the portions 120 of the distributed data structure in one or more nodes of the exemplary storage system 100, such as an exemplary flash based storage node 140 (e.g., a burst buffer node). In addition, the exemplary hierarchical storage tiering system 100 optionally comprises one or more hard disk drives 150.

As discussed hereinafter, the Parallel Log-Structured File System (PLFS) can make placement decisions automatically, as described in U.S. patent application Ser. No. 13/536,331, filed Jun. 28, 2012, entitled "Storing Files in a Parallel Computing System Using List-Based Index to Identify Replica Files," incorporated by reference herein, or it can be explicitly controlled by the application and administered by a storage daemon.

Figure 2:
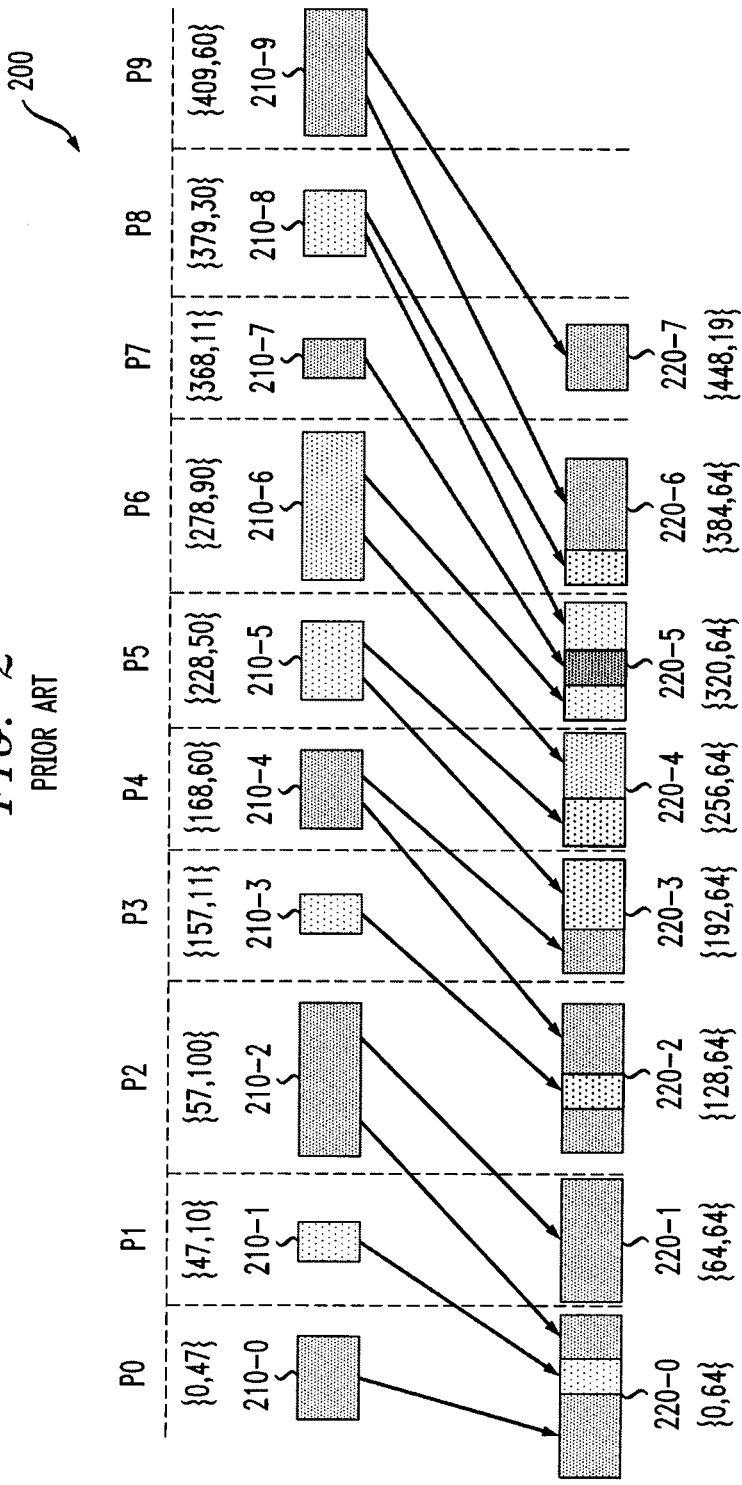
FIG. 2 illustrates an exemplary conventional approach for cooperative parallel writing by a plurality of processes to a shared object.

FIG. 2 illustrates an exemplary conventional approach 200 for cooperative parallel writing by a plurality of processes P0 through P9 of data portions 210-0 through 210-9 to a shared object. As shown in FIG. 2, each data portion 210 is specified by an {offset, size} within the shared object. Generally, the exemplary conventional approach 200 writes chunks or blocks of a fixed size. In the exemplary implementation of FIG. 2, the fixed block size is 64 bytes.

During a first phase, the processes P0 through P9 broadcast the number of bytes that each have to write. For example, Process P0 has 47 bytes to write and Process P3 has 11 bytes to write. Thus, each process P0 through P9 can determine how many bytes it needs to exchange with one or more additional processes P0 through P9 to achieve the exemplary fixed block size of 64 bytes, which is known a priori and is constant across write operations.

An inter-process message exchange occurs during a second phase to re-distribute bytes to achieve blocks 220 having the desired fixed block size. For example, Process P1 sends its 10 bytes to Process P0 and Process P2 sends 7 bytes to Process P0, so that Process P0 has a resulting block 220-0 of 64 bytes.

During a third phase, each process that has a block 220 to write, such as processes P0-P7 in FIG. 2, send the data to the file system for storage, such as the exemplary flash based storage node 140 of FIG. 1. As shown in FIG. 2, each data block 220 is specified by an {offset, size} within the shared object.

The exemplary conventional approach 200 of FIG. 2 must move a significant fraction of the data 210 because it is re-arranging the data in order to be aligned with the artificial file system boundaries. In addition, the exemplary conventional approach 200 is likely to distribute data across widely spaced peers in the super-computer with little probability of locality. Further, this approach is difficult because it relies on accurate knowledge of what are performance meaningful file system boundaries. These values change frequently across different file systems and across different configurations of the same file system. Also, there is no standardized way to discover these values, so specialized code must be written for each file system. In addition, the approach 200 of FIG. 2 may also reduce the total number of writers (Processes P8 and P9 in FIG. 2 do not write any data) and thereby reduce the parallelism in the system.

Aspects of the present invention leverage the parallelism of concurrent writes to a shared object and the high interconnect speed of parallel supercomputer networks to move a small amount of data in order to eliminate a significant amount of metadata. As indicated above, metadata records a location for every byte of data. It is again noted that minimizing metadata is important to avoid unnecessary latency.

Figure 3:
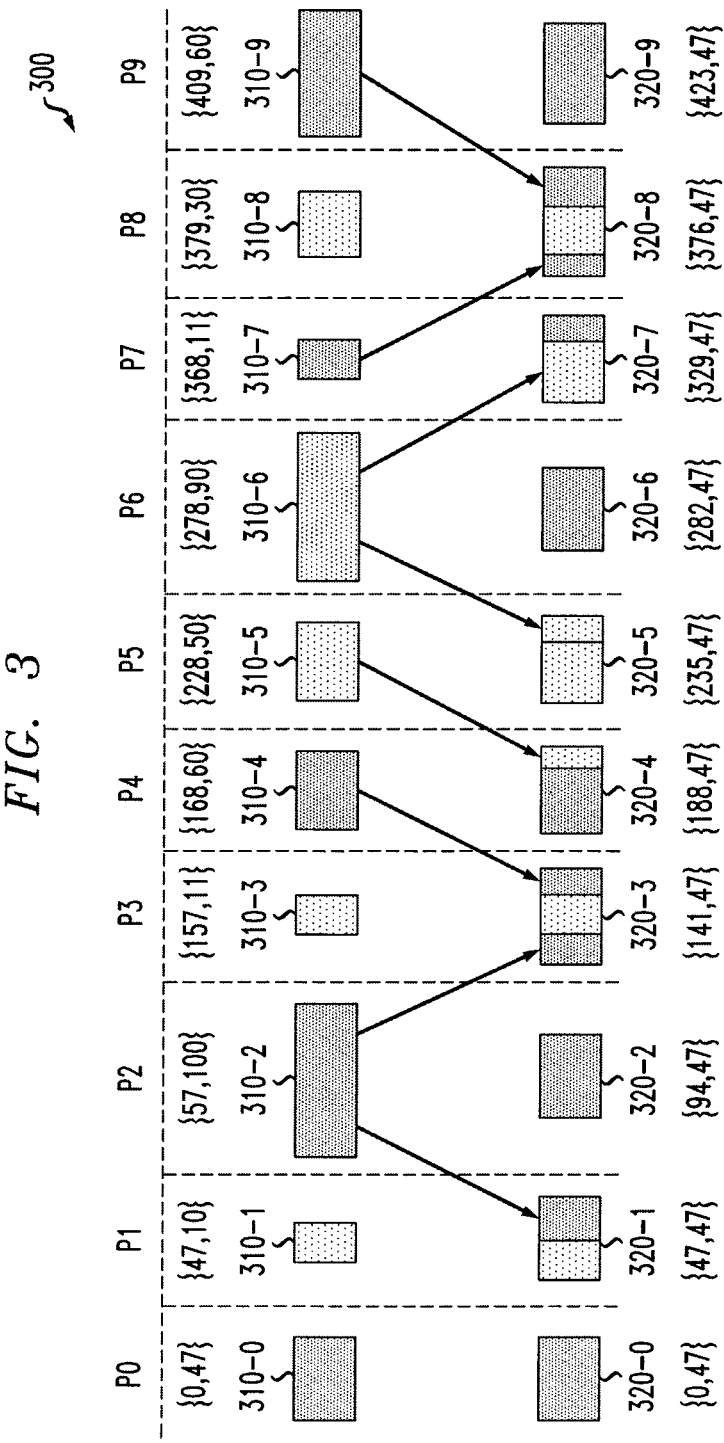
FIG. 3 illustrates an exemplary approach for cooperative parallel writing by a plurality of processes to a shared object in accordance with aspects of the invention.

FIG. 3 illustrates an exemplary approach 300 for cooperative parallel writing by a plurality of processes P0 through P9 of data portions 310-0 through 310-9 to a shared object that incorporate aspects of the invention. As shown in FIG. 3, each data portion 310 is specified by an {offset, size} within the shared object. Generally, the exemplary approach 300 dynamically determines an appropriate block size for writing chunks to the shared object.

During a first phase, the processes P0 through P9 broadcast the number of bytes that each have to write. For example, Process P0 has 47 bytes to write and Process P3 has 11 bytes to write. Thus, each process P0 through P9 can determine the total number of bytes and the total number of processes. The dynamically determined block size can be expressed as follows:

$$= \frac{\text{total number of bytes}}{\text{total number of process}}.$$

In this manner, each process can determine how many bytes it needs to exchange with one or more additional processes P0 through P9 to achieve the dynamically determined block size. In the example of FIG. 3, the dynamically determined block size is 47 bytes (470/10).

An inter-process message exchange occurs during a second phase to re-distribute bytes to achieve blocks 320 having the dynamically determined block size. For example, Process P2 sends 37 bytes to Process P1 and 16 bytes to Process P3, so that Processes P0, P1 and P2 (as well as processes P3-P9) all have a resulting block 320 of 47 bytes.

During a third phase, each process P0-P9 has a block 320 to write and sends the data to the file system for storage, such as the exemplary flash based storage node 140 of FIG. 1. As shown in FIG. 3, each data block 320 is specified by an {offset, size} within the shared object.

Aspects of the present invention recognize that the log-structured file system eliminates the need for artificial file system boundaries because all block sizes perform equally well in a log-structured file system. In this manner, a reduced amount of data is moved using the approach 300 of FIG. 3 to create a uniform distribution of data across the writers. Among other benefits, the disclosed approach of FIG. 3 will tend to move data only between neighboring processes that are more closely located on the supercomputer interconnect network.

FIGS. 4A through 4C, collectively, illustrate exemplary pseudo code 400 for performing the cooperative parallel writing of FIG. 3. The pseudo code 400 is implemented by each of the plurality of processes P0 through P9. In the exemplary embodiment of FIG. 4, each process at a maximum only shuffles bytes with immediate neighbors (which will be the case for most implementations). Algorithms to extend the pseudo code 400 into a more general case in which bytes can be arbitrarily shuffled would be apparent to a person of ordinary skill in the art, based on the disclosure herein. See, for example, http://www.mcs.anl.gov/~thakur/papers/romio-coll.pdf.

In the exemplary embodiment of FIG. 4, a caller has passed a buffer to write to a shared file. Instead of immediately writing the buffer contents, the pseudo code 400 will potentially shuffle pieces of the buffer contents with one or more neighboring processes that have buffers of their own. The portion of code 400 in FIG. 4A calls a routine discussed further below in conjunction with FIG. 5 to determine how many bytes to shuffle. The portion of code 400 in FIG. 4B performs the shuffling and prepares a buffer for writing to the file system. After the shuffling performed by the pseudo code 400 of FIG. 4B, each process will have the same number of 5 bytes. The portion of code 400 in FIG. 4C performs the write operation to the file system.

FIG. 5 illustrates exemplary pseudo code 500 for determining how many bytes to shuffle for the process of FIG. 4. The exemplary pseudo code 500 returns a value of true if simple shuffling is possible, and a value of false otherwise.

Because PLFS files can be shared across many locations, data movement required to implement these functions can be performed more efficiently when there are multiple nodes cooperating on the data movement operations. Therefore, when this is run on a parallel system with a parallel language, such as MPI, PLFS can provide MPI versions of these functions which will allow it to exploit parallelism for more efficient data manipulation.

CONCLUSION

Numerous other arrangements of servers, computers, storage devices or other components are possible. Such components can communicate with other elements over any type of network, such as a wide area network (WAN), a local area network (LAN), a satellite network, a telephone or cable network, or various portions or combinations of these and other types of networks.

While exemplary embodiments of the present invention have been described with respect to processing steps in a software program, as would be apparent to one skilled in the art, various functions may be implemented in hardware, for example, by a programmed general-purpose computer, circuit elements or state machines, or in combination of both software and hardware. Such software may be stored in a memory and employed by, for example, a hardware device, such as a digital signal processor. In one exemplary embodiment, the invention may be implemented by a data storage system having a processing unit and a storage medium.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method performed at a compute node for storing data generated by a plurality of parallel processes to a shared object in a parallel computing system, wherein said method is performed by at least a first one of said parallel processes that generate said shared object, wherein said compute node hosts at least said first one of said parallel processes and wherein said method comprises the steps of:

dynamically determining a write block size for storing said data;

exchanging a determined amount of said data with at least a second one of said parallel processes to achieve a block of said data having said dynamically determined write block size, wherein said exchanging comprises said first one of said parallel processes one or more of (i) sending said determined amount of said data to, and (ii) receiving said determined amount of said data from, said at least second one of said parallel processes to achieve said block of said data having said dynamically determined write block size at said compute node hosting said first one of said parallel processes; and writing said block of said data having said dynamically determined block size to a file system for storage.

2. The method of claim 1, wherein said determined write block size comprises a total amount of said data to be stored by said plurality of parallel processes divided by a number of said plurality of parallel processes.

3. The method of claim 1, further comprising the step of broadcasting a number of bytes to be written by each of said plurality of parallel processes.

4. The method of claim 1, wherein said exchanging step comprises an inter-process message exchange.

5. The method of claim 1, wherein said file system comprises a log structured virtual parallel file system.

6. The method of claim 1, wherein said file system comprises a Parallel Log-Structured File System (PLFS).

7. A compute node apparatus for storing data generated by a plurality of parallel processes to a shared object in a parallel computing system, wherein said apparatus hosts at least a first one of said parallel processes, wherein said apparatus comprises:

a memory; and at least one hardware device operatively coupled to the memory and configured to:

dynamically determine a write block size for storing said data;

exchange a determined amount of said data with at least a second one of said parallel processes to achieve a block of said data having said dynamically determined write block size, wherein said exchange comprises said first one of said parallel processes one or more of (i) sending said determined amount of said data to, and (ii) receiving said determined amount of said data from, said at least second one of said parallel processes to achieve said block of said data having said dynamically determined write block size at said compute node hosting said first one of said parallel processes; and write said block of said data having said dynamically determined block size to a file system for storage.

8. The compute node apparatus of claim 7, wherein said determined write block size comprises a total amount of said data to be stored by said plurality of parallel processes divided by a number of said plurality of parallel processes.

9. The compute node apparatus of claim 7, further comprising broadcasting a number of bytes to be written by each of said plurality of parallel processes.

10. The compute node apparatus of claim 7, wherein said exchange comprises an inter-process message exchange.

11. The compute node apparatus of claim 7, wherein said file system comprises a log structured virtual parallel file system.

12. The compute node apparatus of claim 7, wherein said file system comprises a Parallel Log-Structured File System (PLFS).

13. A data storage system of a compute node for storing data generated by a plurality of parallel processes to a shared object in a parallel computing system, wherein said compute node hosts at least a first one of said parallel processes, wherein said data storage system comprises:

a processing unit that dynamically determines a write block size for storing said data and for exchanging a determined amount of said data with at least a second one of said parallel processes to achieve a block of said data having said dynamically determined write block size, wherein said exchange comprises said first one of said parallel processes one or more of (i) sending said determined amount of said data to, and (ii) receiving said determined amount of said data from, said at least second one of said parallel processes to achieve said block of said data having said dynamically determined write block size at said compute node hosting said first one of said parallel processes; and a storage medium that stores said block of said data having said dynamically determined write block size prior to writing said block of said data to a file system.

14. The data storage system of claim 13, wherein said determined write block size comprises a total amount of said data to be stored by said plurality of parallel processes divided by a number of said plurality of parallel processes.

15. The data storage system of claim 13, wherein said processing unit is further configured to broadcast a number of bytes to be written by each of said plurality of parallel processes.

16. The data storage system of claim 13, wherein said exchange comprises an inter-process message exchange.

17. The data storage system of claim 13, wherein said file system comprises a log structured virtual parallel file system.

18. The data storage system of claim 13, wherein said file system comprises a Parallel Log-Structured File System (PLFS).

19. The method of claim 1, wherein said step of exchanging a determined amount of said data with at least a second one of said parallel processes is performed using an interconnect of said parallel computing system.

20. The compute node apparatus of claim 7, wherein said step of exchanging a determined amount of said data with at least a second one of said parallel processes is performed using an interconnect of said parallel computing system.

* * * * *